United States Patent
Raith

(10) Patent No.: US 6,725,052 B1
(45) Date of Patent: Apr. 20, 2004

(54) CELL ASSIGNMENT METHOD DURING GROUP CALLS

(75) Inventor: Alex Krister Raith, San Diego, CA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/467,711

(22) Filed: Dec. 20, 1999

(51) Int. Cl.$^7$ ................................................ H04B 7/20
(52) U.S. Cl. ..................... 455/518; 455/450; 455/512
(58) Field of Search ................................ 455/509, 512, 455/517, 518–519, 520, 527, 449, 450–454, 422, 436, 437, 439, 440, 442, 525, 514; 370/331, 332

(56) References Cited

U.S. PATENT DOCUMENTS

| | | | |
|---|---|---|---|
| 5,081,671 A | | 1/1992 | Raith et al. |
| 5,428,819 A | * | 6/1995 | Wang et al. ................. 455/454 |
| 5,465,391 A | * | 11/1995 | Toyryla ........................ 455/422 |
| 5,666,655 A | * | 9/1997 | Ishikawa et al. ............. 455/512 |
| 5,751,245 A | | 5/1998 | Janky et al. |
| 5,850,611 A | * | 12/1998 | Krebs .......................... 455/518 |
| 5,862,485 A | * | 1/1999 | Linneweh et al. ........... 455/450 |
| 5,956,644 A | * | 9/1999 | Miller et al. ................ 455/453 |
| 5,970,417 A | * | 10/1999 | Toyryla et al. .............. 455/519 |
| 6,094,581 A | * | 7/2000 | Fried et al. .................. 455/449 |
| 6,181,946 B1 | * | 1/2001 | Gettleman et al. .......... 455/509 |
| 6,219,548 B1 | * | 4/2001 | Feltner et al. ............... 455/433 |
| 6,405,050 B1 | * | 6/2002 | Amirijoo et al. ............. 455/518 |
| 6,493,554 B1 | * | 12/2002 | Kanerva et al. ............. 455/437 |
| 6,529,733 B1 | * | 3/2003 | Qing-An ...................... 455/437 |
| 6,546,250 B1 | * | 4/2003 | Turcotte et al. ............. 455/437 |

FOREIGN PATENT DOCUMENTS

WO WO 00/38439 6/2000

* cited by examiner

Primary Examiner—CongVan Tran
(74) Attorney, Agent, or Firm—Coats & Bennett, P.L.L.C.

(57) ABSTRACT

A cell assignment process strives to minimize the number of cells assigned to mobile terminals involved in any given group call session in both circuit-switched and packet-data environments. In one embodiment, when a cell assignment trigger event is encountered during a group call, the decision whether to change cells or not is based at least in part upon whether the relevant cell is already participating in that group call session with another mobile terminal or not. If so, the cell assignment process preferentially selects such a cell for switching to or avoids changing cell assignment if already assigned there. In another embodiment other cells involved in the group call session are actively sought out and the cell assignments of the mobile terminals involved in the group call session are changed to those cells, even when the signal quality may be acceptable in the current cell. The mobile terminals involved in group call sessions may optionally be given preferential priority when switching cells so as to help minimize disruption to the group call session. Thus, the mobile terminals involved in the group call session are gradually urged toward congregating in the fewest possible cells under the circumstances. Accordingly, the present invention helps provide better service with less of a system capacity penalty for group call sessions.

25 Claims, 3 Drawing Sheets

CELL ASSIGNMENT METHOD DURING GROUP CALLS

BACKGROUND OF THE INVENTION

The present invention relates generally to the assignment of wireless communications mobile terminals to particular cells, and more particularly to the assignment of mobile terminals to particular cells during group calls.

Wireless communications mobile terminals, such as cellular phones and the like, provide a wide variety of services. One increasingly popular service is so-called conference or group call service, wherein a plurality of users having different terminals (mobile or otherwise) are connected together and able to transmit and receive to all of the other active members of a user group. To implement group call functionality in wireless communications system, a user group identification (UGID) code is typically assigned to each of a number of different subsets of mobile terminals. See, for example application Ser. No. 09/192,185, entitled "User Group Indication and Status Change In Radiocommunications Systems," which is incorporated herein by reference.

From a system point of view, one advantage of group calls is that multiple mobile terminals may be able to share a single downlink traffic channel within a given cell, rather than having to have separate downlink traffic channels assigned for each mobile terminal. Further, multiple mobile terminals within a given cell involved in a group call may also be able to share a single uplink traffic channel with some technologies. Focusing on just the downlink channel for simplicity of illustration, assume five mobile terminals ($MT_1$–$MT_5$) are active in the group call and present in the same cell ($C_1$) and two other mobile terminals ($MT_6$–$MT_7$) are active in the same group call in another cell ($C_2$). All the mobile terminals in one cell (e.g., $C_1$ or $C_2$) are typically able to share a single downlink traffic channel assigned to the group call session, rather than having to have separate downlink traffic channels assigned to each mobile terminal. This may result in only two traffic channels being used—one in each cell—rather than seven different traffic channels. From a system point of view, the five channels not used may be assigned to other tasks, thereby allowing for greater overall system capacity utilization.

From time to time during a group call session, a mobile terminal may move from one cell's geographic area to another cell's geographic area and/or the signal quality in a given cell may degrade to a point approaching unacceptable levels. In either case, it may be necessary for the mobile terminal to be assigned to a different cell in order to maintain acceptable performance. That is, the mobile terminal may need to change from communicating with the wireless communications system via base station X to communicating with the wireless communications system via base station Y (or the equivalent in satellite based systems). In circuit switch systems, this process is typically referred to as "handoff," and is typically controlled by the wireless communications system in a manner well known in the art. In packet data systems, this process is typically referred to as "cell reselection," and is typically controlled by the mobile terminal in a manner likewise well known in the art.

If the result of the change in cell assignment is that the mobile terminal is assigned to a cell not otherwise actively engaged in the group call, the new cell must allocate a traffic channel under its control to the group call so that the "newly arrived" mobile terminal may continue to participate in the group call. Thus, in the example given above, if mobile terminal $MT_3$ is moving out of cell $C_1$, it will eventually need to have its cell assignment changed via what is known generically as a cell assignment change procedure. If the result is $MT_3$ being assigned to a new cell $C_3$, then cell $C_3$ must allocate a traffic channel to $MT_3$ so that $MT_3$ can remain active in the group call. In such a situation, the total number of traffic channels needed for the group call session would increase from two to three. Because more channels are being consumed by the group call, the overall capacity of the wireless communications system is reduced. If, on the other hand, mobile terminal $MT_3$ is instead assigned to cell $C_2$, where $MT_6$ and $MT_7$ are already present and active in the group call, then $MT_3$ may simply join $MT_6$ and $MT_7$ on their shared channel. In this scenario, the number of channels used by the group call does not change, and the change in cell assignment for $MT_3$ results in essentially no net loss in capacity to the wireless communications system.

From the above, it is clear that minimizing the number of cells that mobile terminals involved in a given group call are assigned to helps preserve the overall capacity of a wireless communications system. However, the existing cell assignment procedures do not take group call participation into account when assigning a mobile terminal to a cell. Thus, there is a need for an improved cell assignment procedure that recognizes that mobile terminals that are active in a group call should be kept in the same cells to the extent reasonably possible.

SUMMARY OF THE INVENTION

The cell assignment process of the present invention strives to minimize the number of cells assigned to mobile terminals involved in any given group call session. When a cell assignment trigger event, also known as a handoff trigger event or a cell reselection trigger event, is encountered during a group call, the decision whether to change cells or not is based at least in part upon whether the relevant cell is already participating in that group call session with another mobile terminal. If so, the cell assignment process preferentially selects such a cell for switching to, or avoids changing cell assignment if already assigned there.

In one embodiment, the present invention preferentially selects cells already participating in the group call session when changing cell assignments. In other embodiments, the present invention avoids reassigning the mobile terminal in response to encountering a trigger event when several conditions are met. These conditions include, generally, the current cell both having at least minimally acceptable performance and currently supporting at least one other mobile terminal of the same group call session, and also that no candidate cells are currently supporting the same group call session. If the three conditions are met, the cell assignment of the mobile terminal is not changed; otherwise the cell assignment of the mobile terminal is changed. In addition, other embodiments of the present invention actively seek out other cells involved in the group call session and seek to change the cell assignments of the mobile terminals involved in the group call session to those cells, even when the signal quality may be acceptable in the current cell. Thus, the mobile terminals involved in the group call session are gradually urged toward congregating in the fewest possible cells under the circumstances.

The decision whether to make the new cell assignment may be made in the mobile terminal or in the wireless communications system with the present invention. Further, the present approach functions in both circuit-switched and packet-data environments. Additionally, one optional aspect of the present invention is to give mobile terminals involved in group call sessions preferential priority when switching cells so as to help minimize disruption to the group call session. Thus, the present invention helps provide better service with less of a system capacity penalty for group call sessions.

DETAILED DESCRIPTION OF THE INVENTION

Figure 1:
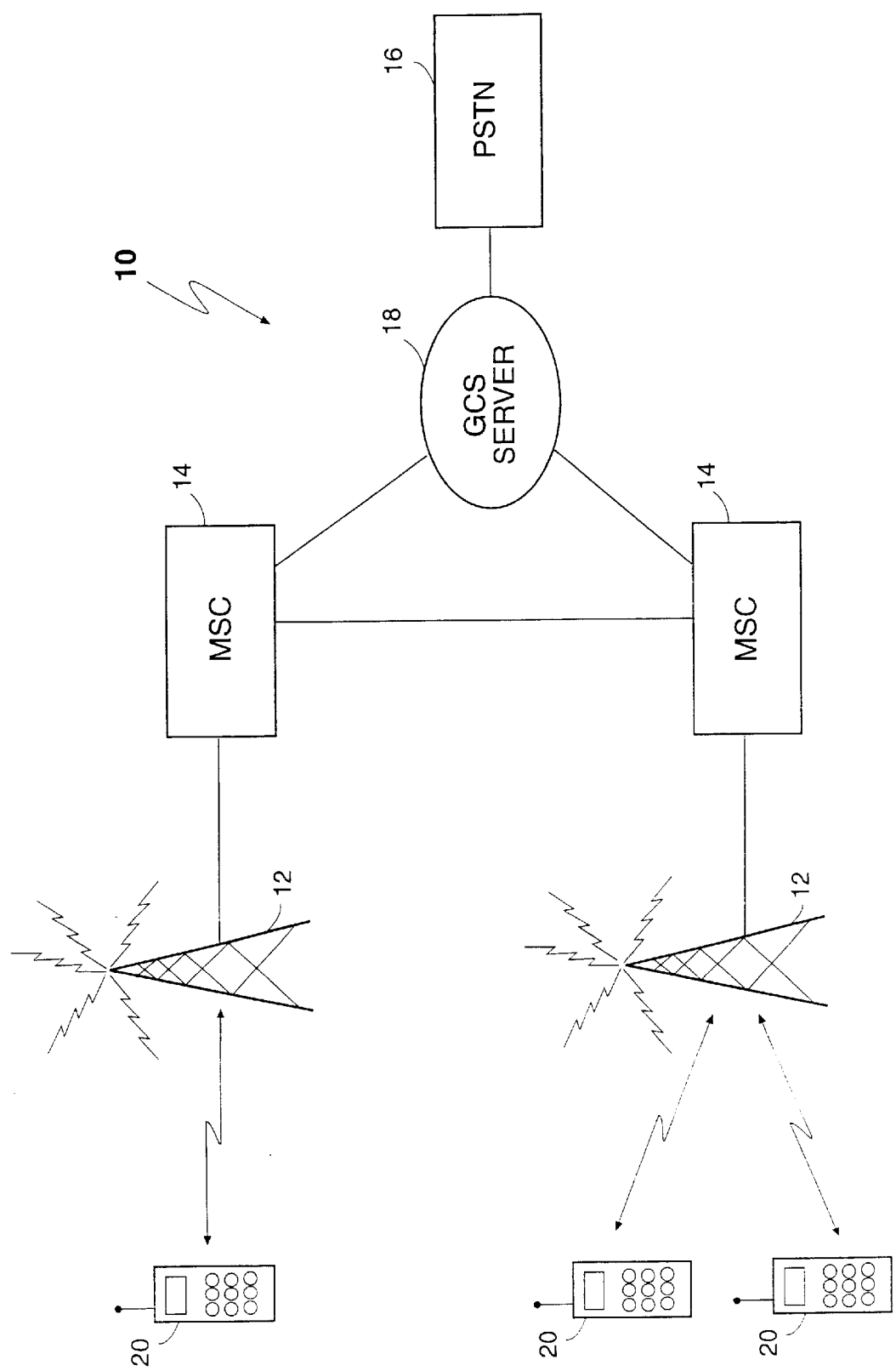
FIG. 1 is a representation of one embodiment of a wireless communications system wherein the present invention may be practiced.

In the following description, like reference characters designate like or corresponding parts throughout the several views. Referring now to the drawings, the improved cell assignment method of the present invention is described. Cell assignment according to the present invention is useful in wireless communications systems, such as that shown schematically in FIG. 1. The wireless communications system, which is indicated generally by the numeral 10, includes a plurality of base stations 12, which are connected via a mobile services switching center (MSC) 14 to a terrestrial communications network such as the Public Switched Telephone Network (PSTN) 16. Each base station 12 is located in and provides service to a geographic region referred to as a cell. In general, there is one base station 12 for each cell within a given system. Within each cell, there may be a plurality of mobile terminals 20 that communicate via a radio link with the base station 12. The base station 12 allows the user of the mobile terminal 20 to communicate with other mobile terminals 20, or with users connected to the PSTN 18. The MSC 14 routes calls to and from the mobile terminal 20 through the appropriate base station 12. Information concerning the location and activity status of the mobile terminal 20 may be stored in a Home Location Register (not shown) and/or a Visitor Location Register (not shown) connected to the MSC 14 in a manner well known in the art. A group call services server (GCS) 18 is connected to the MSCs 14 and PSTN 16 for managing the call setup activities for group calling features in a manner well known in the art. When the wireless communications system 10 receives a group call request, the request is forwarded to the GCS 18. The other components of the system 10 cooperate with the GCS 18 to facilitate the group call.

It is worth noting that a different system architecture is often used for packet data sessions, such as that used in GPRS and Mobile IP. As such, there may be no involvement from the MSC 14. In essence, the base station 12 is connected to a packet data node, and then to the public packet data network through additional nodes to reach the internet. Furthermore, the concepts of the present invention are applicable to all current and future wireless communication systems, including cdma2000 and WCDMA.

Mobile terminals 20 may communicate with the wireless communications system 10 via what are essentially two types of cellular communication techniques, circuit-switched and packet-switched. A circuit-switched connection is a circuit connection that is established and maintained, usually on demand, between two or more stations to allow the exclusive use of the circuit until the connection is released. A packet-switched connection is a logical connection that is established between two or more stations to allow the routing and transfer of data in the form of packets. The channel is occupied during the transmission of a packet only. Upon completion of the transmission, the channel is made available for the transmission of other packets for the same or other stations. Channel selection procedures, and thus cell assignment procedures, typically vary depending on whether circuit-switched or packet-switched connections are used.

Figure 2:
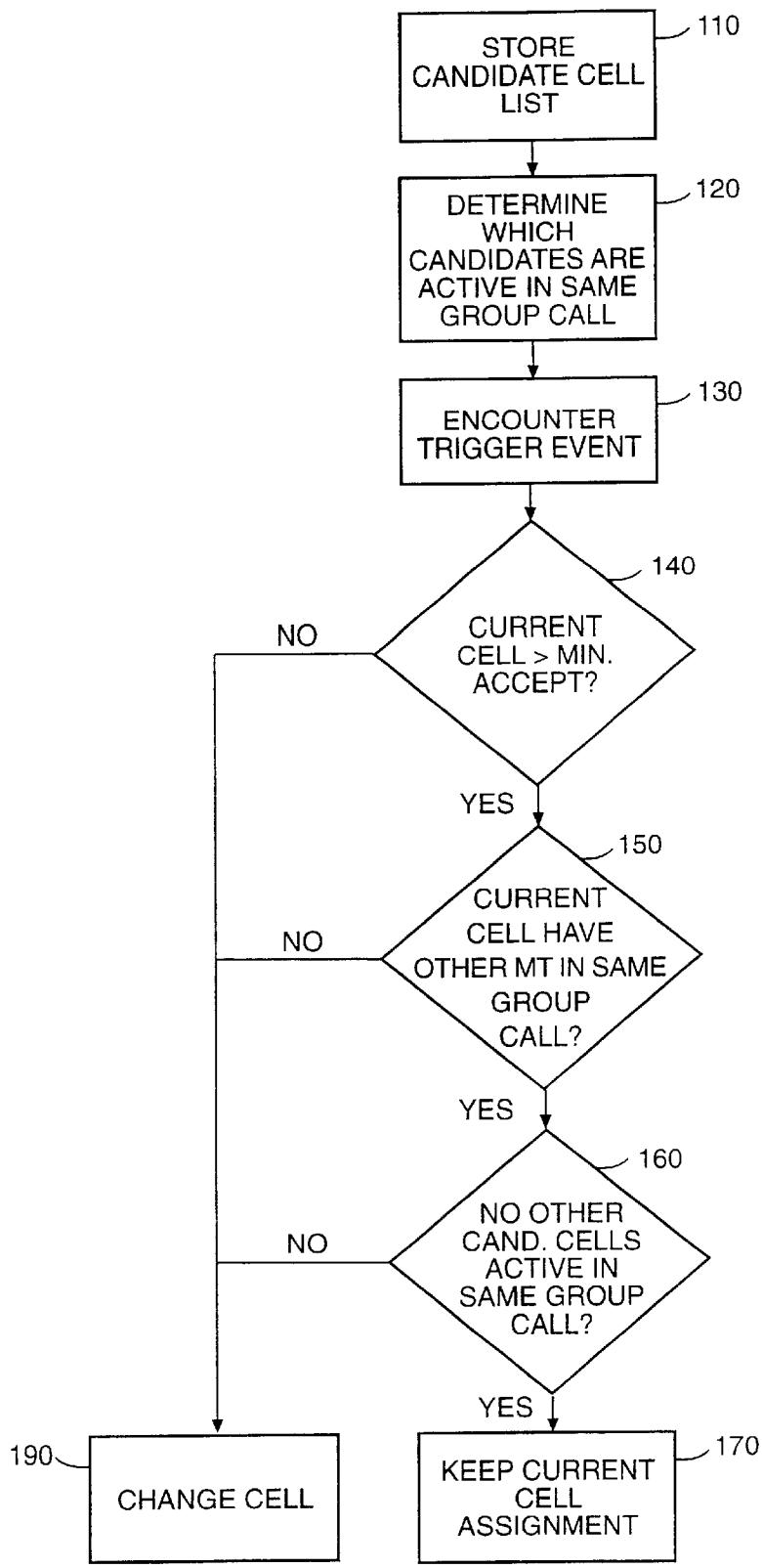
FIG. 2 is a simplified flow chart showing the overall process flow of one embodiment of the present invention.

When a mobile terminal 20 is actively involved in a circuit-switched group call session, the present invention may follow the process shown in FIG. 2. A list of candidate cells for reassignment is stored (box 110). This list may be what is known as a Neighbor List, or the list may take other forms. The intention of the candidate list is to provide a subset of all possible cells that includes the most likely cells that the mobile terminal 20 should be assigned to. Typically, the wireless communications system 10 stores this list and also broadcasts the list to mobile terminals 20 for storage in the mobile terminals 20. The candidate list may be established before or during the group call session and may change during the group call session, particularly as the mobile terminal 20 moves from one cell to another. The cells on the candidate list are examined to see if they are currently participating in the group call session (box 120). For instance, the wireless communications system 10 may simply keep track of all cells currently involved in the group call session and compare the candidate list against this active list. Alternatively, the mobile terminal 20 may monitor the candidate cells, looking for signs of activity in the group call session, such as the presence of the appropriate UGID in a broadcast message. Further still, the wireless communications system 10 may track the cells currently involved in the group call session and transmit this information to the mobile terminal 20, such as in message directed to all mobile terminals 20 active in the group call session, or in a message directed to only that mobile terminal 20. Obviously, the list of active cells should be updated frequently to insure that the latest information is being used.

The main portion of the FIG. 2 process begins when a trigger event is encountered (box 130). A trigger event is an event that suggests that consideration should be given to the mobile terminal 20 changing cell assignment. For instance, a mobile terminal 20 may note that the signal quality in a given cell is degrading to a point approaching unacceptable levels, such as might be encountered when a mobile terminal 20 approaches a cell boundary. The trigger event may be encountered by the mobile terminal 20 or by the wireless communications system 10. If the trigger event is encountered by the mobile terminal 20, the mobile terminal 20 may communicate this situation to the wireless communications system 10, and vice-versa. Further, it should be noted that box 130 is shown in FIG. 2 as occurring after boxes 110 and 120 for ease of description, but this is not required and box 130 may occur before box 120 or box 110.

In response to the trigger event, the cell assignment for the mobile terminal 20 is examined and changed if appropriate. In one embodiment, shown in FIG. 2, the cell assignment is changed (box 190) unless three conditions are met. First, the current cell must have at least minimally acceptable performance (box 140). Because the trigger event is typically encountered when the signal performance is degrading, but still above the minimally acceptable level by some guard amount, it is possible that the signal performance of the current cell will be low enough to constitute a trigger event, but high enough to continue with the current cell for some time. Next, the current cell must be currently supporting at least one other mobile terminal 20 in the same group call session (box 150). Finally, no candidate cells of the candidate list (other than the current cell if it is included in the candidate list) must be currently supporting the same group call session (box 160). If the three conditions are met, the cell assignment of the mobile terminal 20 is not changed (box 170); otherwise the cell assignment of the mobile terminal 20 is changed (box 190).

Typically, the wireless communications system 10 is the entity performing the analysis of boxes 140–160; thus, the wireless communications system 10 typically communicates the change in cell assignment to the mobile terminal 20 by transmitting a cell change instruction to the mobile terminal 20 in a manner well known in the art and appropriate for the protocol being used. For circuit-switched call sessions, this type of instruction is typically referred to as a "handoff" message. The mobile terminal 20 then establishes communications in the new cell as in a manner well known in the art.

It is preferred that the mobile terminal 20 receive preferential treatment from the new cell when changing cell assignments during a group call session. That is, the being-switched mobile terminal 20 should be given greater than normal priority in the "new" cell. For example, if cells typically have a queue for new-to-them calls, the being-switched mobile terminal 20 may be given a preferential position in that queue, or be able to bypass that queue all together. Alternatively, if cells typically reserve a certain number of channels for special purposes, such as for emergency ("911") calls, while allowing the remaining channels to be freely assigned, the being-switched mobile terminal 20 may be given one of the reserved channels, rather than waiting for one of the regular channels.

Preferably, when the mobile terminal 20 changes cells (box 190), it changes to a cell already participating in that group call session. For instance, if there are several candidate cells that would be at least acceptable, the mobile terminal 20 should be assigned preferentially to a cell already participating in that group call session with another mobile terminal 20. In essence, the candidate cells active in the group call session are given more "weight," or stated another way are more "attractive."

It should be noted that the process outlined immediately above results in cell re-assignments being avoided for mobile terminals 20 involved in group call sessions, except when necessary. Thus, the process may be thought of as a cell re-assignment avoidance scheme where the attractiveness of a cell to a mobile involved in a group call session is based at least in part upon whether that cell is already participating in that group call session with another mobile terminal 20. If so, the cell is more attractive to that mobile terminal 20 and more attractive cells are more likely to be switched into (or retain) mobile terminals 20 involved in that group call session.

When a mobile terminal 20 is actively involved in a packet-data group call session, the present invention also follows a process flow similar to that shown in FIG. 2. However, in packet-data call sessions, it is much more likely that the mobile terminal 20 will retain control of cell assignments rather than the wireless communications system 10. Because of this, the mobile terminal 20 typically receives the listing of which candidate cells are active in the group call in a message from the wireless communications system 10. This message may take a wide variety of forms, including a broadcast message containing a simple bit map to be compared against a Neighbor List, indicating which cells are active in the group call session. Alternatively, the message may be an addressed message directed at just that mobile terminal 20 or at several mobile terminals 20, such as all those active in the group call session. Likewise, the wireless communications system 10 may send a message that includes an adjustment to a bias weighting parameter used by a cell assignment routine resident on the mobile terminal 20 that deters changes in cell assignment. For instance, in ANSI-136 systems, a suitable bias weighting parameter is the variable known as $SERV_{13}SS$. In such a manner, the mobile terminal 20 may retain control of the cell assignment process, but be influenced by the wireless communications system 10 to preferentially switch into, or remain with, cells involved in that group call session. Of course, in some packet-data situations, the wireless communications system 10 may control the cell assignment process. Either way, the improved cell assignment process of the present invention tends to minimize the number of cells assigned to mobile terminals 20 involved in any given packet-data group call session.

Figure 3:
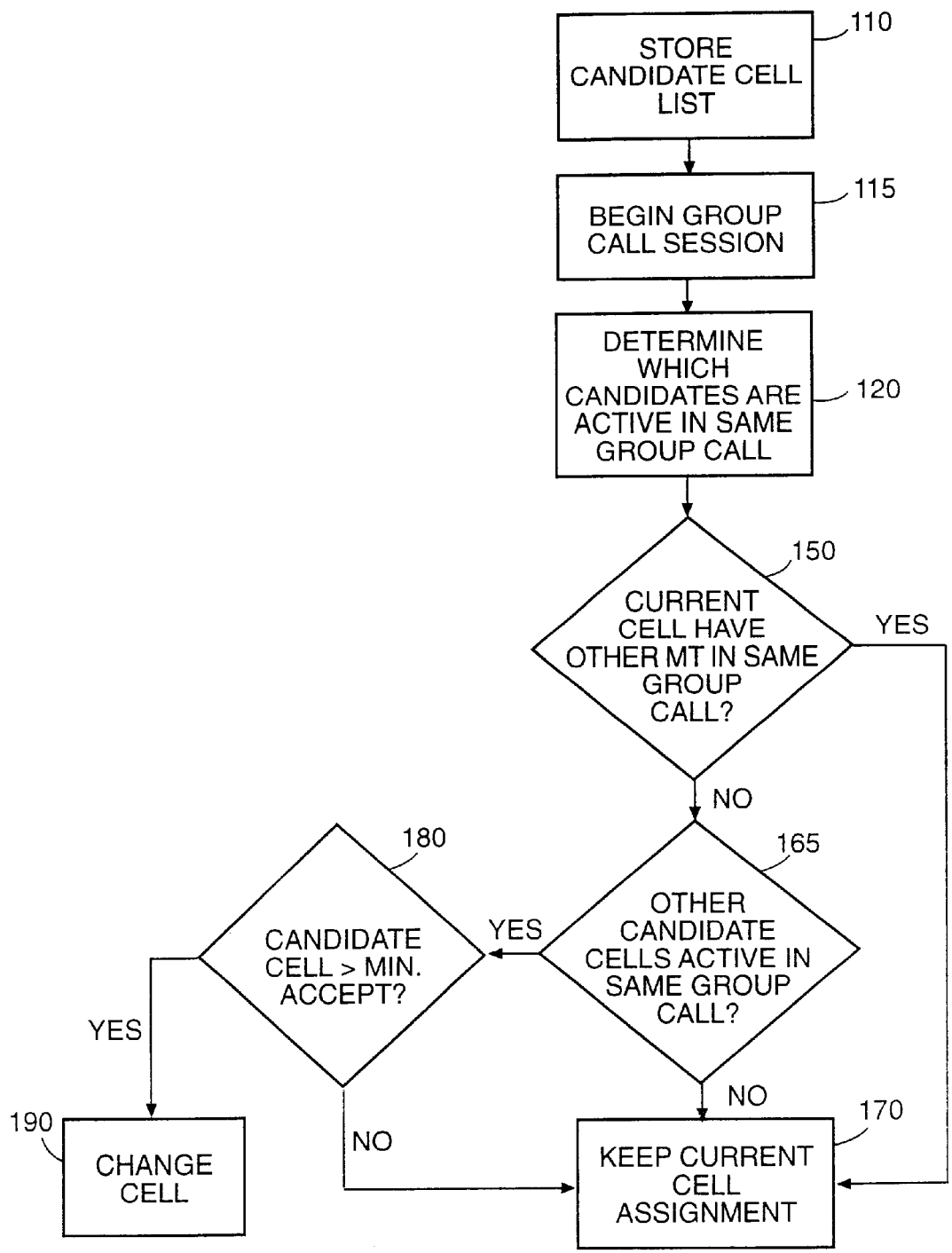
FIG. 3 is a simplified flow chart showing the overall process flow of another embodiment of the present invention.

In some embodiments, the cell assignments mobile terminals 20 involved in a group call session are changed, even when the signal quality may be acceptable in the current cell. As shown in FIG. 3, this active congregation process shares many steps with the process of FIG. 2; differing mainly in that no "trigger event" is required to initiate the cell assignment analysis procedure. Instead, once the mobile terminal 20 becomes involved with the group call session (box 115), an active search process begins. Armed with knowledge of which candidate cells are active in the same group call (box 120), an examination is made of the current cell. If the current cell is supporting another mobile terminal active in the same group call, the current cell assignment is kept (box 170). If not, the process looks to see if any other candidate cells of the candidate list (other than the current cell if it is included in the candidate list) are currently supporting the same group call session (box 160). If not, then the current cell assignment is kept (box 170). If so, the signal quality of the candidate cells that are otherwise supporting the same group call are examined. If any one of such cells have better than at least minimally acceptable signal performance (box 180), then the cell assignment is changed to one of such cells (box 190). If not, the current cell assignment is kept (box 170). Of course, the cell assignment of box 190 may preferably be to the cell otherwise supporting the same group call that has the best signal quality, or to the one having the most available capacity, or the like. In addition, some level above the minimally acceptable level of signal quality may be used as the decision criterion in box 180.

Because no degradation in signal quality is required to change the cell assignment under the process of FIG. 3, this active congregation method may result in mobile terminals active in group call sessions changing cell assignments even when the signal quality, and all other aspects, of the current cell are otherwise good, except for absence of other mobile terminals involved in the group call session. Thus, a mobile terminal active in a group call session may change from one "good" cell to another equally "good" cell for no other reason than to congregate with other mobile terminals also involved in the group call session. In addition, under some circumstances, a mobile terminal active in a group call session may change from one "good" cell to a lower quality, even barely marginal, cell for the same reason. Such an approach may be particularly suited to situations involving an overlay/underlay or hierarchical cell layouts. Of course, suitable anti-hysteresis measures should be employed, such as minimum time delays between cell assignment changes, to avoid tying up resources by having mobile terminals chase each other from cell to cell in an endless loop.

While not required, the both the cell re-assignment avoidance aspect and the active congregation aspect are preferably practiced simultaneously. In this fashion, the improved cell assignment process of the present invention may most quickly minimize the number of cells assigned to mobile terminals 20 involved in any given group call session.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of controlling cell assignment of a wireless communications mobile terminal during a group call session, comprising:
    storing a list of candidate cells;
    determining whether at least one of said candidate cells is participating in said group call session;
    selecting a new cell from said list of candidate cells based on whether said candidate cells, including said at least one of said candidate cells, are participating in said group call session in response to a cell selection trigger event during said group call session;
    wherein said mobile terminal communicates with at least one wireless communications system during said group call session;
    wherein selecting a new cell from said list of candidate cells based on whether said candidate cells are participating in said group call session in response to the cell selection trigger event during said group call session is performed by said wireless communications system; and
    sending said mobile terminal an indication of which of said candidate cells are participating in said group call session by said wireless communications system via a broadcast message.

2. The method of claim 1 wherein said determining whether said at least one of said candidate cells is participating in said group call includes determining which, if any, of said candidate cells is participating in said group call.

3. The method of claim 1 wherein said selecting a new cell from said list of candidate cells based on whether said candidate cells are participating in said group call session in response to a the cell selection trigger event during said group call session is performed by said mobile terminal.

4. The method of claim 1 wherein selecting a new cell from said list of candidate cells based on whether said candidate cells are participating in said group call session in response to a cell selection trigger event during said group call session is performed by a wireless communications system in communication with said mobile terminal and further including said mobile terminal changing cell selection based on instructions received from said wireless communications system.

5. The method of claim 1 wherein said sending said mobile terminal an indication of which of said candidate cells are participating in said group call session by said wireless communications system is performed via a broadcast message via an addressed message.

6. The method of claim 5 wherein said sending said mobile terminal an indication of which of said candidate cells are participating in said group call session by said wireless communications system is performed via a broadcast message to all mobile terminals active in said group call.

7. A method of controlling cell assignment of a wireless communications mobile terminal during an active packet data group call session, comprising:
    storing a list of candidate cells including a current cell;
    receiving, at the mobile terminal, said list of candidate cells from a corresponding wireless communications system;
    determining whether at least one of said candidate cells is participating in said group call session;
    said mobile terminal determining whether to stay with said current cell or to select a new cell in response to a cell selection trigger event during said group call session, said mobile terminal determining to remain with the current cell if:
        i) said current cell provides at least minimally acceptable signal quality; and
        ii) said current cell is participating in said group call session with another mobile terminal assigned to said current cell; and
        iii) no acceptable candidate cells, not including said current cell, are participating in said group call session.

8. The method of claim 7 wherein said receiving, at the mobile terminal, said list of candidate cells from the corresponding wireless communications system includes said mobile terminal receiving a message addressed to all active group members in said group call session.

9. The method of claim 8 further including said wireless communications system broadcasting a neighbor list of candidate cells and wherein said message addressed to all active group members in said group call session includes a bit map indicating which of said candidate cells on said neighbor list are active in said group call session.

10. The method of claim 7 further including said wireless communications system broadcasting a neighbor list of candidate cells on a broadcast control channel and wherein said broadcast control channel further includes information indicating which of said candidate cells on said neighbor list are active in said group call session.

11. The method of claim 7 wherein said mobile terminal determining whether to stay with said current cell or to select a new cell in response to a cell selection trigger event during said group call session is based on an algorithm that includes a bias weighting factor parameter and further including said wireless communications system transmitting a message revising said bias weighting factor parameter so as to deter changes in cell selection.

12. The method of claim 11 wherein said wireless communications system transmitting a message revising said bias weighting factor parameter so as to deter changes in cell selection is performed by transmitting a broadcast message.

13. The method of claim 11 wherein said wireless communications system transmitting a message revising said bias weighting factor parameter so as to deter changes in cell selection is performed by transmitting a message addressed to all active group members in said group call session.

14. The method of claim 7 wherein said mobile terminal determining whether to stay with said current cell or to select a new cell in response to a cell selection trigger event during said group call session is based on an algorithm that includes a bias weighting factor parameter and further including preprogramming said bias weighting factor parameter into said mobile terminal so as to deter changes in cell selection into cells not actively supporting said group call session.

15. A method of controlling cell assignment of a wireless communications mobile terminal by a wireless communications system during an active packet data group call session, comprising:

storing a list of candidate cells including a current cell;

determining whether at least one of said candidate cells other than said current cell is participating in said group call session;

receiving notification at the corresponding wireless communications system that the mobile terminal has encountered a cell selection trigger event during said group call session;

thereafter, said wireless communications system determining whether said mobile terminal should stay with the current cell or change in response to said cell selection trigger event, said wireless communications system determining that said mobile terminal should change cells unless:
i) the current cell provides at least minimally acceptable signal quality to said mobile terminal;
ii) the current cell is participating in said group call session with another mobile terminal assigned to said current cell; and
iii) no acceptable candidate cells, not including the current cell, are participating in said group call session;

said wireless communications system instructing said mobile terminal to change cells if said wireless communications system determines that said mobile terminal should change cells.

16. A method of controlling cell assignment of a wireless communications mobile terminal operating in conjunction with a wireless communications system during an active circuit switched group call, comprising:

storing a list of candidate cells including a current cell at said wireless communications system;

said wireless communications system determining which, if any, of said candidate cells is participating in said group call;

said wireless communications system determining whether said mobile terminal should stay with the current cell or be handed off to another cell in response to a handoff trigger event, said wireless communications system determining that said mobile terminal should be handed off to another cell unless:
i) said current cell provides at least minimally acceptable signal quality to said mobile terminal;
ii) said current cell is participating in said group call with another mobile terminal assigned to said current cell; and
iii) no acceptable candidate cells, not including said current cell, are participating in said group call;

said wireless communications system instructing said mobile terminal to change cells if said wireless communications system determines that said mobile terminal should be handed off to another cell.

17. A method of controlling cell assignment of a wireless communications mobile terminal operating in conjunction with a wireless communications system during an active circuit switched group call, comprising:

communicating with said mobile terminal via a first cell during said group call;

assigning a greater than normal priority to said mobile terminal and handing off said mobile terminal to a second cell with said greater than normal priority in response to a handoff trigger event during said group call.

18. A method of controlling cell assignment of a wireless communications mobile terminal operating in conjunction with a wireless communications system during an active circuit switched group call, comprising:

communicating with said mobile terminal via a first cell during said group call;

assigning a greater than normal priority to said mobile terminal and handing off said mobile terminal to a second cell with said greater than normal priority in response to a handoff trigger event during said group call, said second cell maintaining a queue of channel assignment requests; and assigning a preferential position in said queue to said handed-off group call.

19. The method of claim 18 further including said second cell maintaining a queue of channel assignment requests and further including assigning the most preferential position in said queue to said handed-off group call.

20. A method of controlling cell assignment of a wireless communications mobile terminal operating in conjunction with a wireless communications system during an active circuit switched group call, comprising:

communicating with said mobile terminal via a first cell during said group call;

assigning a greater than normal priority to said mobile terminal and handing off said mobile terminal to a second cell with said greater than normal priority in response to a handoff trigger event during said group call, said second cell maintaining a queue of channel assignment requests; and allowing said handed-off group call to bypass said queue.

21. A method of controlling cell assignment of a wireless communications mobile terminal operating in conjunction with a wireless communications system during an active circuit switched group call, comprising:

communicating with said mobile terminal via a first cell during said group call;

assigning a greater than normal priority to said mobile terminal and handing off said mobile terminal to a second cell with said greater than normal priority in response to a handoff trigger event during said group call; and wherein said second cell includes normal and reserve channels and further including allocating said handed-off group call one of said reserve channels.

22. A method of controlling cell assignment of a wireless communications mobile terminal participating in a group call session, comprising:

assigning said mobile terminal to a first cell;

storing a list of candidate cells including a second cell;

determining if said second cell is participating in said group call session;

selectively changing the cell assignment of said mobile terminal from said first cell to said second cell based on participation of said first and second cells in said group call session;

wherein said selectively changing the cell assignment of said mobile terminal includes changing the cell assignment of said mobile terminal from said first cell to said second cell if:

said first cell is not participating in said group call session with another mobile terminal assigned to said first cell;

said second cell is participating in said group call session; and said second cell provides at least minimally acceptable signal quality to said mobile terminal.

23. A method of controlling cell assignment of a wireless communications mobile terminal participating in a group call session, comprising:

assigning said mobile terminal to a first cell;

storing a list of candidate cells including a second cell;

determining if said second cell is participating in said group call session;

selectively changing the cell assignment of said mobile terminal from said first cell to said second cell based on participation of said first and second cells in said group call session;

wherein said selectively changing the cell assignment of said mobile terminal includes changing the cell assignment of said mobile terminal from said first cell to said second cell if:

said first cell is not participating in said group call session with another mobile terminal assigned to said first cell;

said second cell is participating in said group call session; and said second cell provides signal quality of better than a predetermined level to said mobile terminal.

24. A method of controlling cell assignment of a wireless communications mobile terminal participating in a group call session, comprising:

assigning said mobile terminal to a first cell;

storing a list of candidate cells including a second cell;

determining if said second cell is participating in said group call session;

selectively changing the cell assignment of said mobile terminal from said first cell to said second cell based on participation of said first and second cells in said group call session;

wherein said mobile terminal is a first mobile terminal and further including assigning a second mobile terminal to said second cell prior to said determining if said second cell is participating in said group call session and wherein said selectively changing the cell assignment of said mobile terminal includes changing the cell assignment of said mobile terminal from said first cell to said second cell because said second mobile terminal is participating in said group call session in said second cell.

25. A method of controlling cell assignment of a wireless communications mobile terminal participating in a group call session, comprising:

assigning said mobile terminal to a first cell;

storing a list of candidate cells including a second cell;

determining if said second cell is participating in said group call session;

selectively changing the cell assignment of said mobile terminal from said first cell to said second cell based on participation of said first and second cells in said group call session;

wherein selectively changing the cell assignment of said mobile terminal from said first cell to said second cell based on participation of said first and second cells in said group call session includes said mobile terminal controlling said selectively changing the cell assignment of said mobile terminal from said first cell to said second cell based on participation of said first and second cells in said group call session.

* * * * *